(12) United States Patent
Farrugia et al.

(10) Patent No.: US 10,050,957 B1
(45) Date of Patent: Aug. 14, 2018

(54) SMART CARD REDIRECTION

(71) Applicant: Parallels International GmbH, Schaffhausen (CH)

(72) Inventors: Daniel Farrugia, Sliema (MT); Paul Gafa, Sliema (MT); Nikolay Dobrovolskiy, Moscow (RU); Serguei Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 119 days.

(21) Appl. No.: 15/094,314

(22) Filed: Apr. 8, 2016

(51) Int. Cl.
*H04L 29/06* (2006.01)

(52) U.S. Cl.
CPC ........ *H04L 63/0853* (2013.01); *H04L 63/083* (2013.01); *H04L 63/102* (2013.01)

(58) Field of Classification Search
CPC . H04L 63/0853; H04L 63/083; H04L 63/102; H04L 63/0884; H04L 63/0823; G06F 21/41
USPC .......................................................... 726/7
See application file for complete search history.

(56) References Cited

U.S. PATENT DOCUMENTS

| | | | | |
|---|---|---|---|---|
| 5,724,417 A | * | 3/1998 | Bartholomew | ........ H04Q 3/627 235/380 |
| 2005/0071282 A1 | * | 3/2005 | Lu | ........................... G06F 21/42 705/64 |
| 2005/0108571 A1 | * | 5/2005 | Lu | ........................... G06F 21/34 726/4 |
| 2006/0294023 A1 | * | 12/2006 | Lu | ........................... G06F 21/34 705/67 |
| 2009/0150667 A1 | * | 6/2009 | Baltzer | ................... G06F 21/34 713/159 |
| 2011/0107409 A1 | * | 5/2011 | Wilkinson | ............ G06F 21/335 726/8 |
| 2011/0315763 A1 | * | 12/2011 | Hochmuth | .............. G06F 15/16 235/380 |
| 2014/0123265 A1 | * | 5/2014 | Borzycki | ............ G06F 21/6218 726/8 |
| 2016/0094546 A1 | * | 3/2016 | Innes | .................. H04L 63/0823 713/156 |

OTHER PUBLICATIONS

Kumar, Manoj. "An Enhanced Remote User Authentication Scheme with Smart Card." IJ Network Security 10.3 (2010): 175-184.*

(Continued)

*Primary Examiner* — Syed Zaidi
(74) *Attorney, Agent, or Firm* — Lowenstein Sandler LLP

(57) ABSTRACT

A processing device of a server executing an application establishes a network connection to a client device having a smart card, detects a program call directed to a smart card application programming interface (API) to authenticate a user of the client device for accessing the application, and determines, based on the program call, whether the smart card is a remote smart card for the server. Responsive to determining that the smart card is the remote smart card, the processing device redirects the program call to the client device via a separate communication channel of the network connection and authenticates, by the server, the user of the client device in view of data returned by the program call, as if the remote smart card were local to the server.

20 Claims, 5 Drawing Sheets

(56) References Cited

OTHER PUBLICATIONS

Anonymous. "Logging on with a Smart Card." Technet.microsoft.com. Accessed Oct. 1, 2016. https://technet.microsoft.com/en-us/library/cc961954.aspx. 2 pages.

Anonymous. "Windows Vista Smart Card Infrasturcture." msdn.mircosoft.com. Accessed Oct. 1, 2016. https://msdn.microsoft.com/en-us/library/bb905527(d=printer).aspx. 41 pages.

Anonymous. "Network Level Authentication." en.wikipedia.org. Accessed Oct. 1, 2016. https://en.wikipedia.org/wiki/Network_Level_Authentication. 2 pages.

Anonymous. "Smart Card and Remote Desktop Services." Feb. 18, 2010. Accessed Oct. 1, 2016. https://technet.microsoft.com/en-us/library/ff404286.aspx. 4 pages.

Anonymous. "Remote Desktop Protocol." Accessed Oct. 1, 2016. https://en.wikipedia.org/wiki/Remote_Desktop_Protocol. 8 pages.

\* cited by examiner

SMART CARD REDIRECTION

TECHNICAL FIELD

Aspects and implementations of the present disclosure relate to smart cards, and more specifically, to smart card redirection.

BACKGROUND

Smart cards can be used to authenticate a user, for example, when the user logs into a network and/or computing system. Smart cards can provide a strong form of authentication from the use of cryptography-based identification and proof of possession when authenticating the user. Smart card authentication is a two-factor authentication method in that (1) a user presents a smart card, and (2) the user provides a personal identification number (PIN). In the case of smart cards, a malicious person would have to obtain both the smart card of the user and the PIN of the user to impersonate the user.

FIG. 1 is an example of conventional prior art system architecture 100 for authenticating a user 101 via a local smart card 103. A user 101 that attempts to log on to a computer (e.g., computing machine 120) generally enters the user's credentials, which are used to verify the user's identity. For smart card logons, a user's credentials and/or one or more values derived from the user's credentials are contained on the security chip of the smart card 103, which is read by a device, such as a smart card reader. A user 101 can insert a smart card 103 into a smart card reader associated with a computing machine 120, and a Windows® logon service (WINLOGON) 121 prompts the user 101 to enter a PIN (rather than a username and password) as input via a graphical user interface being displayed on the computing machine 120. WINLOGON 121 can reside on the computing machine 120, which is the same computing machine 120 that is coupled to the smart card 103, to authenticate the identity of the user 101 to allow the user 101 to log into an operating system (e.g., Windows® operating system) and/or applications that may be executing on the computing machine 120.

WINLOGON 121 can pass the PIN to an LSA application programming interface (API) 123 to communicate to the Local Security Authority (LSA) 126. The LSA 126 is a protected system process that can authenticate and log users (e.g., user 101) on to the computer (e.g., computing machine 120). The LSA 126 can include a subsystem, Local Security Authority Subsystem Service (LSASS) 127, that is responsible for enforcing the security policy on the system (e.g., computing machine 120). The LSASS 127 can verify users (e.g., user 101) logging on to a computing system 120 (e.g., Windows® computer) or a server. The LSASS 127 can be a process in an operating system (e.g., Windows® operating system).

The LSASS 127 can create an access token for an authenticated user. The PIN can be passed to the LSASS 127, which can generate and return an access token. The access token can be used to impersonate an authenticated user (e.g., user 101).

The logon information to authenticate the user 101 with a domain controller 122 can be stored in an encrypted format on the smart card 103. The smart card 103 can contain a microprocessor and non-volatile memory that stores the user's logon information, private key 108, digital certificate 105 that includes a public key 107, and other private information. A public key infrastructure (PKI) can create secure communications. PKI is asymmetric in that a key pair is used to create the secure communications. A public key 107 of the user 101 can be used to encrypt data and a private key 108 of the user 101 can be used to decrypt data. PKI uses digital certificates (e.g., certificate 105) that include a public key 107 of a user 101 for encrypting data. The public key 107 can be made publicly available to one or more entities (e.g., domain controller 122) for creating secure communications with a respective entity. The private key 108 is not made publicly available, and is kept secret by the owner (e.g., user 101).

The LSA 126 can use the PIN to access the smart card 103. The LSASS 127 can issue one or more program calls (e.g., smart card API calls 124) to the native smart card API 125 (e.g., native Windows® Smart Card (WinSCard) API) to interact with the local smart card 103 to obtain the certificate 105 containing the public key 107 from the smart card 103. The native smart card API 125 (e.g., WinSCard API) is used by applications to interact with smart cards (e.g., smart card 103). The LSASS 127 can pass the PIN to the smart card 103 via the smart card API calls 124 made to the native smart card API 125.

The smart card 103 can confirm that the PIN is valid if the smart card 103 can use the PIN to successfully decrypt the user's logon information that is stored on the smart card 103. If the PIN is valid, the smart card 103 allows the LSASS 127 to obtain the certificate 105 containing the public key 107 that is stored on the smart card 103 via the native smart card API 125. The certificate 105 can be an X.509 (e.g., X509 v3) certificate. In some implementations, if the PIN cannot successfully decrypt the user's logon information for a number of times, for example, because the PIN is incorrect, the smart card 103 is locked.

The LSASS 127 can send the user's certificate 105, which contains the user's public key 107, along with other user information to a domain controller 122 as pre-authentication data in an initial authentication request. The domain controller 122 can validate the certificate 105, extract the public key 107, and use the public key 107 to encrypt a logon session key. The domain controller 122 returns the encrypted logon session key to the computing machine 120. If the computing machine 120 is in possession of the private key 108 of the user 101, the computing machine 120 can use the private key 108 to decrypt the logon session key. The computing machine 120 and the domain controller 122 can use the logon session key in further communications between each other.

This traditional mechanism can only be used for local smart card authentication, where the smart card and authentication server reside on the same computing machine. If the user 101 needs to access an operating system and/or applications on a remote computing machine, the described mechanism cannot provide for remote smart card authentication.

As described above, current solutions utilizing the LSA Subsystem Service (LSASS) do not provide for remote smart card authentication. Remote Desktop Protocol (RDP) is known to be used in a Remote Desktop Services (RDS) environment to authenticate remote smart cards. Remote Desktop Services (RDS) is a Microsoft® component that allows a user to take control over a remote computer or virtual machine over a network connection. A Remote Desktop Session Host (RDSH) server is an RDS component that hosts Windows® based programs or a full Windows® desktop, which remote RDS clients can access. Users can connect to an RDSH server to run programs, to save files, and to use network resources on that server. Remote Desktop Protocol provides a user with a graphical interface to connect to an RDSH server over a network. A smart card can be used to remotely authenticate a user to an RDSH server.

FIG. 2 is an example of conventional prior art RDS system architecture 200 for providing, using RDP, remote smart card authentication to provide a user with access to applications on an RDSH server. Users (e.g., user 201) can connect, via RDS clients (e.g., client device 210) and an RDP connection 240 over network 250, to an RDSH server 230 hosted on a computing system 220 to run applications 231 or full desktops hosted on the RDSH server 230. For example, the applications 231 may include an email application, a word processing application, a spreadsheet application, a presentation application, etc. that may be used by one or more users 201 and client devices 210.

In order to provide RDS, there needs to be the RDP connection 240 between the client device 210 and the RDSH server 230 to allow the client device 210 to access the applications 231 being hosted by the RDSH server 230. For security reasons, the user 201 needs to be authenticated to the RDSH server 230 before logging into an RDP session. Traditionally in a Windows® 2003 environment, a user 201 must first establish the RDP connection 240 between the client device 210 and the RDSH server 230 prior to authenticating with the RDSH server 230. The user 201 can initiate the RDP connection 240 via a graphical user interface (GUI).

Logging into an RDP session using simply a user name and password generally does not provide strong authentication and may not satisfy, for example, a company's security policies. To help strengthen security, there may be a need to replace the traditional mechanism of using a user name and password for logging into an RDP session with a more robust form of authentication, such as remote smart card authentication.

Some traditional technology, such as Network Level Authentication (NLA), can allow the user 201 to be authenticated via the remote smart card 203 before an RDP connection 240 is established. NLA is a technology used in Remote Desktop Services or Remote Desktop connection that requires the connecting user (e.g., user 201) to be authenticated before a session is established with the server (e.g., server 230). NLA uses Credential Security Support Provider protocol (CredSSP), and requires that CredSSP be enabled in a system registry. The operating system of the client device (e.g., client device 210) has a CredSSP client component and the server (e.g., server 230) has a CredSSP server component. NLA delegates the user's credentials from the client through CredSSP client component and prompts the user (e.g., user 201) to authenticate before establishing a session on the server (e.g., server 230). NLA, however, is a limited solution in that NLA does not support other credential providers.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure address the above and other deficiencies of conventional authentication solutions by providing a service that allows server applications to authenticate remote smart card users using a separate, dedicated communication channel of a network connection. Aspects and implementations of the present disclosure are directed to authenticating remote smart users without initiating an RDP session (i.e., prior to establishing any RDP connection).

Figure 3:
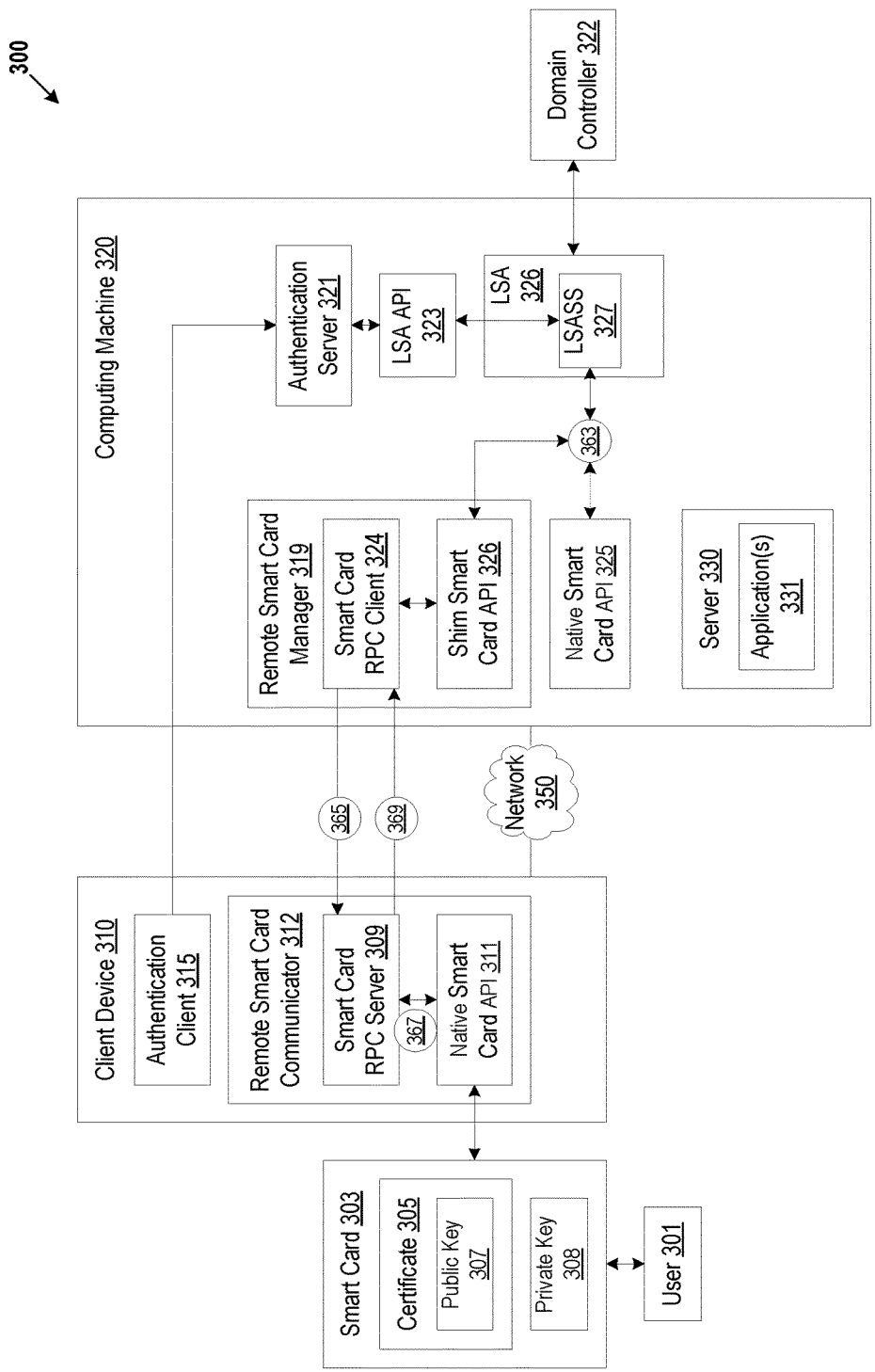
FIG. 3 is example novel system architecture for authenticating a remote smart card using a separate, dedicated communication channel of a network connection, in accordance with various implementations of the present disclosure.

FIG. 3 is example novel system architecture 300 for authenticating a remote smart card using a separate, dedicated communication channel of a network connection, in accordance with various implementations of the present disclosure. A user 301 can use a client device 310 to access applications 331 hosted by a server 330. An example of a server 330 can include, and is not limited to, a RDSH server. "User" is a person or a device of a person requesting remote access to a computing system. The user 301 can use a smart card 303 to be authenticated remotely for access to the server 330. Multiple users 301 of different client devices 310 can request remote access to the server 330 and use different smart cards 303 for remote authentication. Each user 301 can use a single smart card 303 with one or more client devices 310. A client device 310 can be a mobile device (e.g., tablet, smart phone), a PDA, a laptop, a desktop computer, or any other computing device. The server 330 can be hosted on a computing machine 320 (e.g., server computer system, a desktop computer or any other computing device).

Aspects of the present disclosure provide a service that allows a server (e.g., authentication server 321, server 330) to authenticate remote smart card users, such as user 301. There can be a network connection between the computing machine 320 and the client device 310. The service includes a server-side remote smart card manager 319 and a remote client-side smart card communicator 312 that can create a separate, dedicated communication channel of the network connection between an authentication server 321 and a remote smart card 303 over network 350 for authenticating the user 301 via the remote smart card 303 for example, for access to application(s) 331 on server 330. The separate, dedicated communication channel of the network connection between the remote smart card 303 and a server (e.g., authentication server 321) for authenticating the user 301 is made without any RDP session and is independent of RDP. An authentication server 321 is used as an example server to authenticate remote smart card users.

In one implementation, the separate communication channel of the network connection is between two different physical computing devices—one computing device (e.g., client device 310) that is hosting the card reader of the smart card 303 and another computing device (e.g., computing machine 320) that is executing the authentication server 321 and/or application(s) 331. The authentication server 321, server 330, and/or application(s) 331 can be hosted on the same computing machine (e.g., a computing machine 320) (e.g., a server computer system, a desktop computer or any other computing device), or different computing machines. The authentication server 321, server 330, and/or application(s) 331 can be executing on a Windows® operating system.

In another implementation, the authentication server and/or application(s) are executing on a virtual machine being hosted on the same physical computing device that is coupled to the smart card, and the separate communication channel of the network connection is between the authentication server and/or application(s) executing on the virtual machine, and the smart card.

Figure 1:
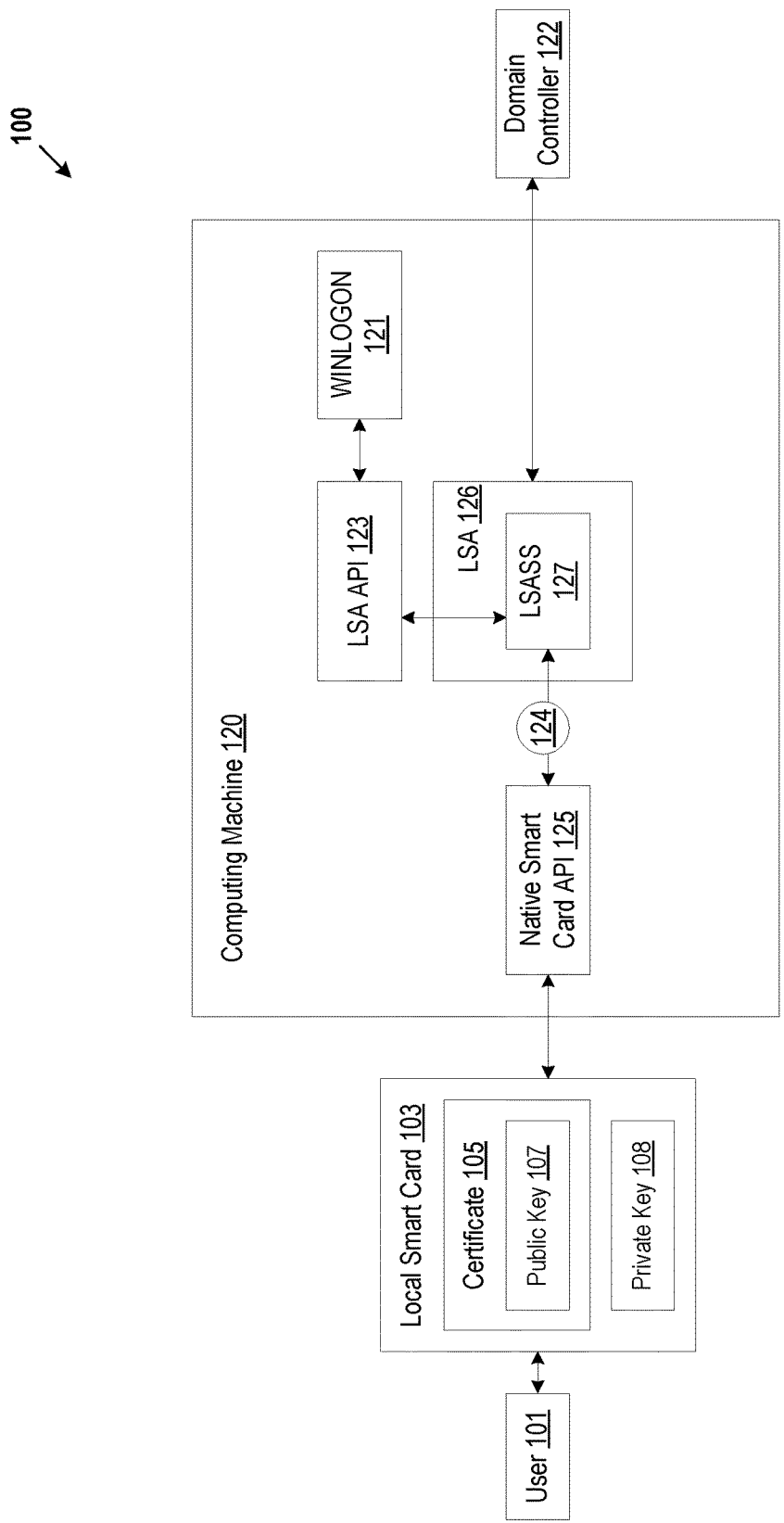
FIG. 1 is an example of conventional prior art system architecture for authenticating a user via a local smart card.
Figure 2:
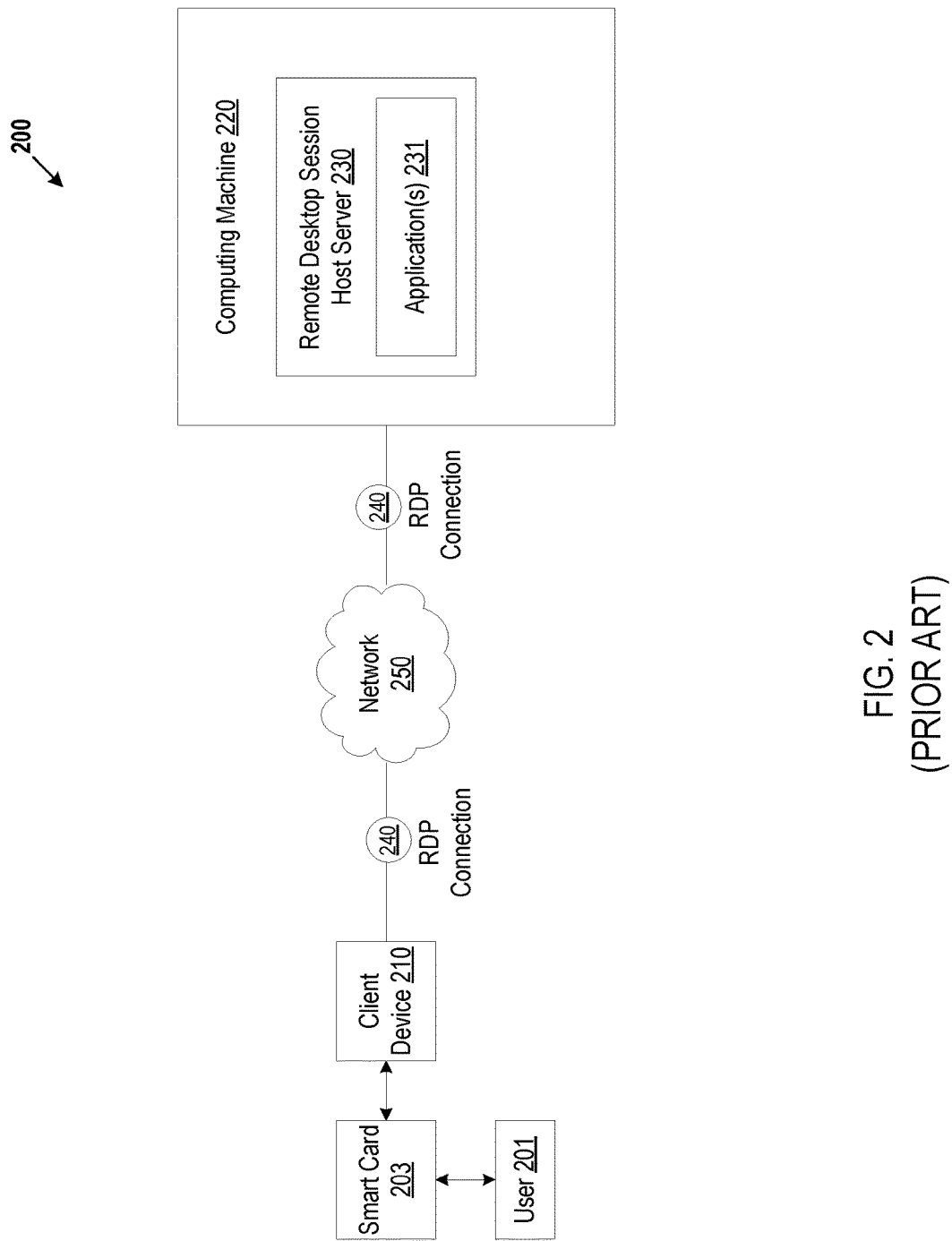
FIG. 2 is an example of conventional prior art remote desktop services system architecture for providing, using remote desktop protocol, remote smart card authentication to provide a user with access to applications on a Remote Desktop Session Host server.

Unlike the prior art computing machine 120 in FIG. 1, where the smart card 103 inserted into a card reader is local to the authentication server 121, in the system architecture 300 in FIG. 3, a smart card 303 is inserted into a card reader on a client device 310 and is remote to the authentication server 321. As discussed above, in conventional solutions, such as prior art architecture 100 in FIG. 1, the LSASS 127 can send smart card API calls 124 directly to the native smart card API 125 to access a local smart card 103. In contrast, in the system architecture 300 in FIG. 3, a remote smart card manager 319 can detect whether a program call is made from a remote smart card (i.e., smart card that is remote to the server) or a local smart card (i.e., smart card that is local to the server), intercept program calls (e.g., smart card API calls 363) that are made from remote smart cards, that are issued by the LSASS 327 and that are intended to be received by the native smart card API 325 on the computing machine 320, and redirect the intercepted smart card API calls 363 to the remote smart card 303 via the separate, dedicated communication channel of the network connection by translating the smart card API calls 363 into messages that are transmitted to the remote smart card 303 via an RPC connection. The RPC connection can be between the smart card RPC client 324 and the smart card RPC server 309. The dedicated communication channel of the network connection can be represented by the shim smart card API 326 in the remote smart card manager 319 communicating with the smart card remote procedure call (RPC) client 324, the smart card RPC client 324 communicating with the smart card RPC server 309 in the remote smart card communicator 312, and the smart card RPC server 309 communicating with the native smart card API 311.

The smart card 303 should be provided by and authorized by a system administrator. The authorized smart card 303 can contain a microprocessor and non-volatile memory to store logon information of the user 301, a private key 308 of the user, and a preconfigured digital certificate 305, which includes the public key 307 of the user 301. The private key 308 and public key 307 are a PKI key pair that can be used to create secure communications. The public key 307 of the user 301 can be used to encrypt data, and the private key 308 of the user 301 can be used to decrypt data. The public key 307 can be made publicly available to one or more entities (e.g., domain controller 322) for creating secure communications with a respective entity. The private key 308 is not made publicly available, and is kept secret by the owner (e.g., user 301).

A user 301 can insert a smart card 303 into a card reader on the client device 310, and an authentication client 315 on the client device 301 can prompt the user 301 to enter a PIN as input via a graphical user interface being displayed on the client device 310. The authentication client 315 can establish a network connection with an authentication server (e.g., authentication server 321) on computing machine 320, and send the PIN from the client device 310 to the authentication server 321 for remote authentication of the smart card 303. The client device 310 can communicate with the authentication server 321, and send the PIN to the authentication server 321, without joining an Active Directory Domain. The client device 310 can communicate with the authentication server 321 even if the client device 310 is on a domain that is different from the domain of the authentication server 321.

The authentication server 321 provides the PIN to the LSA 326 via the LSA API 323. The LSA 326 is a protected system process that can authenticate and log users (e.g., user 301) on to the computer (e.g., computing machine 320). The LSA 326 can include a subsystem, Local Security Authority Subsystem Service (LSASS) 327, that is responsible for enforcing the security policy on the system (e.g., computing machine 320). The LSASS 327 can verify users (e.g., user 301) logging on to a computing system 320 (e.g., Windows® computer) or a server. The LSASS 327 can be a process in an operating system (e.g., Windows® operating system).

The LSASS 327 in the LSA 326 can use the PIN, for example, (1) to access the smart card 303, extract the certificate 305, and send the certificate 305 to a domain controller 322 to obtain a logon session key from the domain controller 305, and/or (2) generate an access token for the user 301. The access token can be used to impersonate the user 301. The logon session key is used for communication between the domain controller 322 and the computing machine 320. A logon session key and an access token are described in greater detail below.

The LSASS 327 is unaware that the smart card 303 is not on the computing machine 320 and can issue one or more program calls (e.g., smart card API calls 363), which are intended for the native smart card API 325, to attempt to interact with the smart card 303. The remote smart card manager 319 can intercept the program call (e.g., smart card API calls 363), determine that the smart card API calls 363 should be sent to a remote smart card, and redirect the smart card API calls 363, via the dedicated communication channel of the network connection over network 350, to the remote smart card communicator 312 on the client device 310 to interact with the remote smart card 303 coupled to the client device 310. Network 350 can be a private network (e.g., a local area network (LAN), a wide area network (WAN), intranet, or other similar private networks) or a public network (e.g., the Internet).

The separate dedicated communication channel of the network connection can be opened by remote procedure call (RPC) components (e.g., smart card RPC client 324 and smart card RPC server 309). The remote smart card manager 319 can include the shim smart card API 326 (e.g., shim WinSCard API) to intercept the smart card API calls 363 made by the LSASS 327. The shim smart card API 326 can include a shim library for intercepting and redirecting the smart card API calls 363 to a remote system (e.g., remote smart card 303). The shim library can serve as a transparent gateway between the authentication server 321 and the remote smart card 303. The shim smart card API 326 can be hooked into LSASS 327 to intercept the smart card API calls 363, and redirect the smart card API calls 363 to the remote smart card communicator 312 on the remote client device 310. API hooking is a method to change the behavior of a binary process without changing the code of the binary process. The shim smart card API 326 can be implemented, for example, by injecting a Dynamic Link Library (DLL), known as a hooking DLL, into a target process (e.g., LSASS 327 process). The hooking DLL of the shim smart card API 326 can replace traditional smart card API functions performed by the native smart card API 325 with custom smart card API functions to intercept the smart card API calls 363 made by the LSASS 327.

The hooking DLL of the shim smart card API 326 can be injected into the LSASS 327 process to change how the LSASS 327 process interacts with smart cards (e.g., remote smart card 303). When the shim smart card API 326 is hooked, the intercepting and redirecting is performed transparently from the LSASS 327 perspective. The LSASS 327 unknowingly calls the smart card functions in the hooking DLL of shim smart card API 326, rather than the actual native smart card API 325. In one implementation, a helper application can inject the hooking DLL of the shim smart card API 326 into LSASS 327. In one implementation, the hooking DLL of the shim smart card API 326 can be distributed in the form of a Windows® service.

In one implementation, the authentication server 321 can change the association of a network socket, which is connected to the client device 310, from the process of the authentication server 321 to the process of the LSASS 327, which is hooked by the shim smart card API 326. For example, authentication server 321 can associate the network socket with the LSASS 327 process by passing an identifier of the network socket to the LSASS 327 process. In another example, a new communication channel of the network connection may be established for RPC calls between the smart card RPC client 324 and the smart card RPC server 309. Once the network socket is associated with the LSASS 327 process, the network socket can be used by the DLL library of the shim smart card API 326 to intercept and redirect the smart card API calls 363 made by the LSASS 327 to the remote smart card communicator 312 on the client device 310. When the authentication of the remote smart card 303 is complete, the network socket can be associated with the process of the authentication server 321, and the authentication server 321 can use the network socket for further communication with the client device 310. In another example, where a new communication channel of the network connection is established for the RPC components (e.g., smart card RPC client 324, smart card RPC server 309), when the authentication of the remote smart card 303 is complete, the communication channel of the network connection can be terminated.

The remote smart card manager 319 can include a remote procedure call (RPC) client component (e.g., smart cart RPC client 324) to transmit messages reflecting smart card API calls 363 that pass through the shim smart card API 326, and redirect the messages representing the smart card API calls 365 to an RPC server component (e.g., smart card RPC server 309) in the remote smart card communicator 312 on the client device 310. The smart card RPC server 309 can decode the messages reflecting the smart card API calls 365 received from smart card RPC client 324, and interact with the local smart card 303 by making smart card API calls 367, which correspond to the decoded messages, to the native smart card API 311 on the client device 310. The client device 310 can be executing an operating system (e.g. Windows®, OS X® or Linux®), which supports the smart card API 311.

For example, the corresponding smart card API calls 367 may request to extract the certificate 305 that contains the public key 307 for user 301 from the smart card 303 using the PIN that is provided by the user 301. The native smart card API 311 can interact with the smart card 303 to determine whether the PIN is valid, and can use the PIN to extract the certificate 305 that contains the public key 307 for user 301 from the smart card 303 if the PIN is valid.

The native smart card API 311 can receive a result that contains the certificate 305 and the public key 307 from the smart card 303, and can provide the result to the smart card RPC server 309. The smart card RPC server 309 can create a message reflecting the result and send the result message 369 to the smart card RPC client 324. The smart card RPC server 309 can be platform agnostic and can support different operating systems, such as Windows®, OS X®, and Linux®. The smart card RPC client 324 can obtain the result message 369 from the smart card RPC server 309, decode the result message, and pass the result (e.g., certificate 305 and the public key 307) to the LSASS 327.

The LSASS 327 can send the certificate 305, which contains the public key 307, along with other user information to a domain controller 322 to obtain logon session key from the domain controller 322 as pre-authentication data in an initial authentication request. The domain controller 322 can validate the certificate 305 and extract the public key 307 from the certificate 305. The domain controller 322 can generate a logon session key and use the public key 307 to encrypt the logon session key. The domain controller 322 returns the encrypted logon session key to the computing machine 320. If the computing machine 320 is in possession of the private key 308 of the user 301, the computing machine 320 can use the private key 308 to decrypt the logon session key. The computing machine 320 and the domain controller 322 can use the logon session key in further communications between each other.

The authentication server 321 can provide the PIN to the LSA 326 via the LSA API 323 to obtain an access token from the LSASS 327. The LSASS 327 in the LSA 326 can use the PIN to generate an access token for impersonating the user 303. The LSA API 323 can communicate with the LSASS 327 to obtain the access token and can return the access token to the authentication server 321 and/or application(s) 331 to be used to impersonate the user 301 for example, for accessing an application 331.

The access token can be used to impersonate the user 301 for performing operations or for accessing resources (e.g., applications 331) using the authenticated identity of the user 301. Impersonation is the ability of a process thread to execute in a security context that is different from the context of the process that owns the thread. Impersonation is designed to meet the security requirements of client/server applications. An access token that is used for impersonation is also referred to as an "impersonation token". One of the service's threads can use an access token, which is a representation of a user's (e.g., user 301) credentials, to obtain access to the objects (e.g., applications 331) to which the client has access. For example, the user 301 may wish to use client device 310 to access an application 331 on server 330 on the computing machine 320. The server 330 process is responsible for performing the task for handling the request from the client device 310. The server 330 process should perform the task as if the server 330 process were the client device 310. The server 330 process can create a process thread with the access token (e.g., impersonation token) of the user 301 to identify itself as the user 301 to perform the task of accessing the application 331.

The remote smart card manager 319 may enable authentication for both remote smart cards and local smart cards and can use a repurposed session parameter to determine whether a program call is for a local smart card or a remote smart card. The authentication server 321 can indicate to the shim smart card API 326 when to intercept smart card API calls 363 that are issued by the LSASS 327 by repurposing a session parameter. A traditional system generally does not need to identify that a smart card is a remote smart card for the server (e.g., authentication server 321); hence, the traditional LSA API 323 does not support the passing of smart card identifiers and/or client identifiers of the client device. Aspects of the present disclosure can address this deficiency by having the authentication server 321 repurpose a session parameter (e.g., Windows® session parameter), which is intended to hold a session number (e.g., Windows® session number) of the process calling into LSASS 327.

For example, for the remote smart card 303, the authentication server 321 can create an invalid session number for the session parameter when calling the LSA API 323, which can subsequently be interpreted by the shim smart card API 326 (when the shim smart card API 326 intercepts the smart card API calls 363) that the smart card 303 is a remote smart card for the server (e.g., authentication server 321) and that the smart card API calls 363 should be delivered to a native smart card API 311 on the remote client device 310.

The authentication server 321 can create the invalid session number upon the receiving the PIN from the authentication client 315 on the client device 310. In response to receiving the PIN, the authentication server 321 can set the session parameter to an invalid session number when calling the LSA API 323.

The LSA API 323 can provide the session parameter, which has been set to an invalid session number, to the LSASS 327. The LSASS 327 can make smart card API calls 363 using the invalid session number. The shim smart card API 326 can intercept the smart card API calls 363 and check the session parameter, for example, against a session table, to determine if the session exists or not. If the session does not exist, then the shim smart card API 326 can determine that the smart card API calls 363 were issued by the LSASS 327 on behalf of the authentication server 321. The invalid session number also serves as an indicator that the smart card 303 is a remote smart card for the server (e.g., authentication server 321). If the shim smart card API 326 determines, in view of the session number being invalid, that the smart card 303 is a remote smart card, the smart card RPC client 324 can redirect the smart card API calls 363 to the remote smart card communicator 312 on the client device 310.

If the session exists, the shim smart card API 326 can determine that smart card API calls 363 were initiated by another process, which indicates that the smart card 303 is a local smart card for the server (e.g., authentication server 321, server 330). For example, a smart card may be inserted into the computing machine 320 for a non-authentication purpose in a circumstance where authentication is not needed. For instance, the smart card may be used to reliably and safely store a user's medical history, and the smart card may be coupled to the computing machine 320 for another process (e.g., medical application) to access. In such a case, rather than intercepting the smart card API calls 363 made by the LSASS 327, the shim smart card API 326 can allow the smart card API calls 363, with the session parameter for the valid session for the medical application, to be sent to the native smart card API 325 on computing machine 320.

Figure 4:
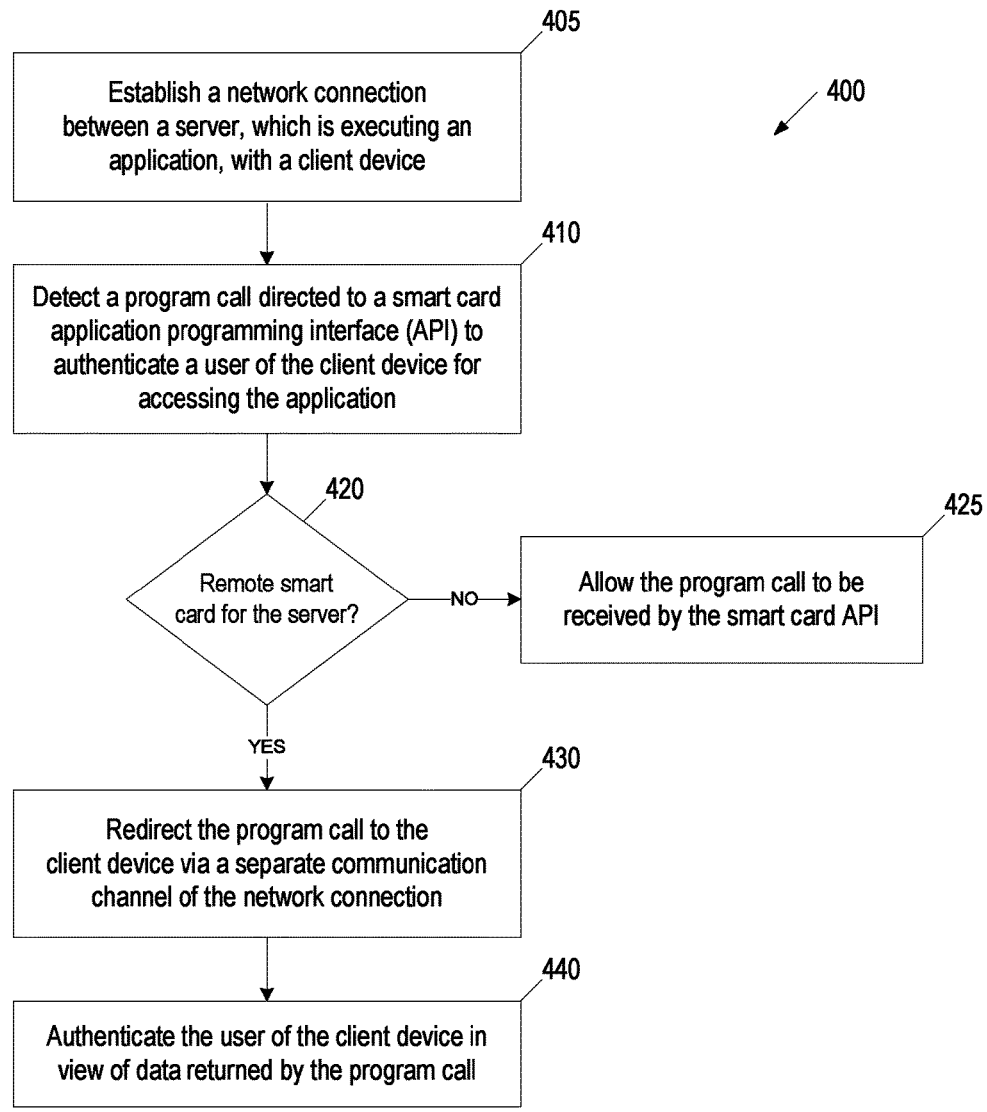
FIG. 4 depicts a flow diagram of aspects of a method for authenticating a remote smart card using a separate communication channel of a network connection, according to various implementations of the present disclosure.

FIG. 4 depicts a flow diagram of aspects of a method 400 for authenticating a remote smart card using a separate communication channel of a network connection, according to various implementations of the present disclosure. The method 400 can performed by processing logic that may comprise hardware (circuitry, dedicated logic, etc.), software (such as is run on a general purpose computer system or a dedicated machine), or a combination of both. In one implementation, the method is performed by a remote smart card manager 310 in a computing machine 320 of FIG. 3, while in some other implementations one or more blocks of FIG. 4 may be performed by another machine and/or an LSA (e.g., LSA 326 of FIG. 3) in computing machine (e.g., computing machine 320 of FIG. 3).

At block 405, the processing device establishes a network connection between a computing machine hosting a server executing an application and a client device. A smart card is coupled to the client device. The computing machine can include an authentication server (e.g., authentication server 321 in FIG. 3), an application server executing an application (e.g., application 331 in FIG. 3), and/or an RDSH server. The processing device can establish such a network connection without initiating an RDP session between a smart card RPC client (e.g., smart card RPC client 324 in FIG. 3) and a smart card RPC server 309 (e.g., smart card RPC server 309 in FIG. 3).

At block 410, the processing device detects that a program call is directed to a native smart card application programming interface (API) (e.g., native smart card API 325 in FIG. 3). The program call may be for authenticating a user of the client device for accessing the application. The program call can be a smart card API call (e.g., smart card API call 363 in FIG. 3) being made by a LSASS (e.g., LSASS 327 in FIG. 3). The processing device can detect the program call by injecting a dynamic link library into a local security authority process (LSASS) to change interaction of the local security authority process with one or more smart cards, such that the program call issued by the LSASS are being intercepted by the process device. In one implementation, the processing device can detect the program call by changing an association of a network socket that corresponds to particular communication channel of the network connection from a process of the server (e.g., authentication server) to a process of a local security authority subsystem service (LSASS) to intercept the program call.

At block 420, the processing device determines, based on the program call, whether the smart card is a local smart card for the server (e.g., authentication server, application server) or a remote smart card for the server. The processing device can identify a session parameter in the program call, compare the session parameter to session identifiers in a session table, and determine whether the session parameter is valid from the session identifiers in the session table. The session parameter in the program call may have been a repurposed session parameter that is set by the authentication server (e.g., authentication server 328 in FIG. 3) as an indicator to the processing device that the smart card is a remote smart card for the server. For example, when the authentication server receives a PIN from the authentication client on the client device, the authentication server can set the session parameter to an invalid session number when calling the LSA API. In some implementations, the LSA API has passed the invalid session number to the LSASS, and the LSASS has inserted the invalid session number as the session parameter in the program call.

The processing device can extract the session number in the session parameter from the program call and determine from a session table if the session exists or not. The session table can include valid session numbers. If the session number in the program call does not match a session number in the session table, the processing device can determine that the session does not exist, and that the session parameter is not valid. The processing device can determine from the session parameter not being valid that the program call is directed to a remote smart card.

If the session number in the program call matches a session number in the session table, the processing device can determine that the session does exist, and that the session parameter is valid. The processing device can determine from the session parameter being valid that the program call originated from a process other than the authentication server and is directed to a local smart card. For example, the processing device may reside on a computing machine that has a smart card locally connected to the computing machine, and the program call is intended for the local smart card. In another example, the processing device may reside on a computing machine is being used as a terminal server, and the program call is intended for an RDP protocol.

If the processing device determines that the smart card is a local smart card and is not a remote smart card (block 420), the processing device allows the program call to be received by the native smart card API at block 425.

If the processing device determines that the smart card is a remote smart card for the server (block 420), the processing device redirects the program call to the client device of the user via a separate, dedicated communication channel of the network connection at block 430. The processing device can redirect the intercepted program call by sending a remote procedure call corresponding to the intercepted program call to the client device via the network socket that was associated with the process of the LSASS.

At block 440, the processing device authenticates the user of the client device in view of data returned by the program call, as if the remote smart card were local to the server. The processing device can receive, from the returned program call, data, such as, one or more user credentials (e.g., digital certificate, public key) and/or a value confirming that the PIN is valid. The value can be a binary value that indicates that the PIN is valid.

In one implementation, the digital certificate that contains the public key can be returned by the program call. The processing device can use the certificate and public key to determine whether the certificate is valid to authenticate the user. For example, the processing device can send the certificate along with other user information to a domain controller. The domain controller can authenticate the user using the certificate and user information. If the user is successfully authenticated, the domain controller can generate a logon session key, which indicates that the user has been authenticated, and provide the logon session key to the processing device.

In another implementation, prior to detecting the program call, the computing machine hosting the server (e.g., authentication server) receives the PIN of the user from the client device, which initiates the authentication of the user for accessing the application. The PIN is associated with the smart card. The processing device receives the PIN and inserts the PIN as a parameter in the program call and directs the program call to the smart card API. The processing device determines that the smart card is a remote smart card and redirects the program call to the client device via the separate communication channel of the network connection. The smart card inserted in the card reader on the client device can process the PIN and determine that the PIN is valid. The smart card can then provide a value confirming that the PIN is valid. The processing device can receive the value and authenticate the user in view of the value.

In one example, after a user is authenticated, the authentication server can receive an access token for impersonating the user from a LSA. In one example, after a user is authenticated, the processing device provides information of applications that the authenticated user (e.g., user 301 in FIG. 3) is authorized to access. The processing device can provide the information to a client device, which can display a graphical user interface (GUI), for example, of a list of applications available to the user. The processing device can receive user input of the user selection of one or more applications to access. The processing device can establish respective session connections, between the client device and a respective application, for each selected application.

In another example, after a user is authenticated, the processing device can initiate, based on a request, an RDP session with the client device. The RDP session can be established via the separate, dedicated communication channel of the network connection or another communication channel of the network connection.

In one implementation, the processing device can determine that authentication of the user of the smart card is complete and can modify the changed association of the network socket, which is connected to the client device, from the process of the LSASS back with the process of the server to allow the server to have communications with the client device. The RDP session can be established using the network socket that is re-associated with the server.

Figure 5:
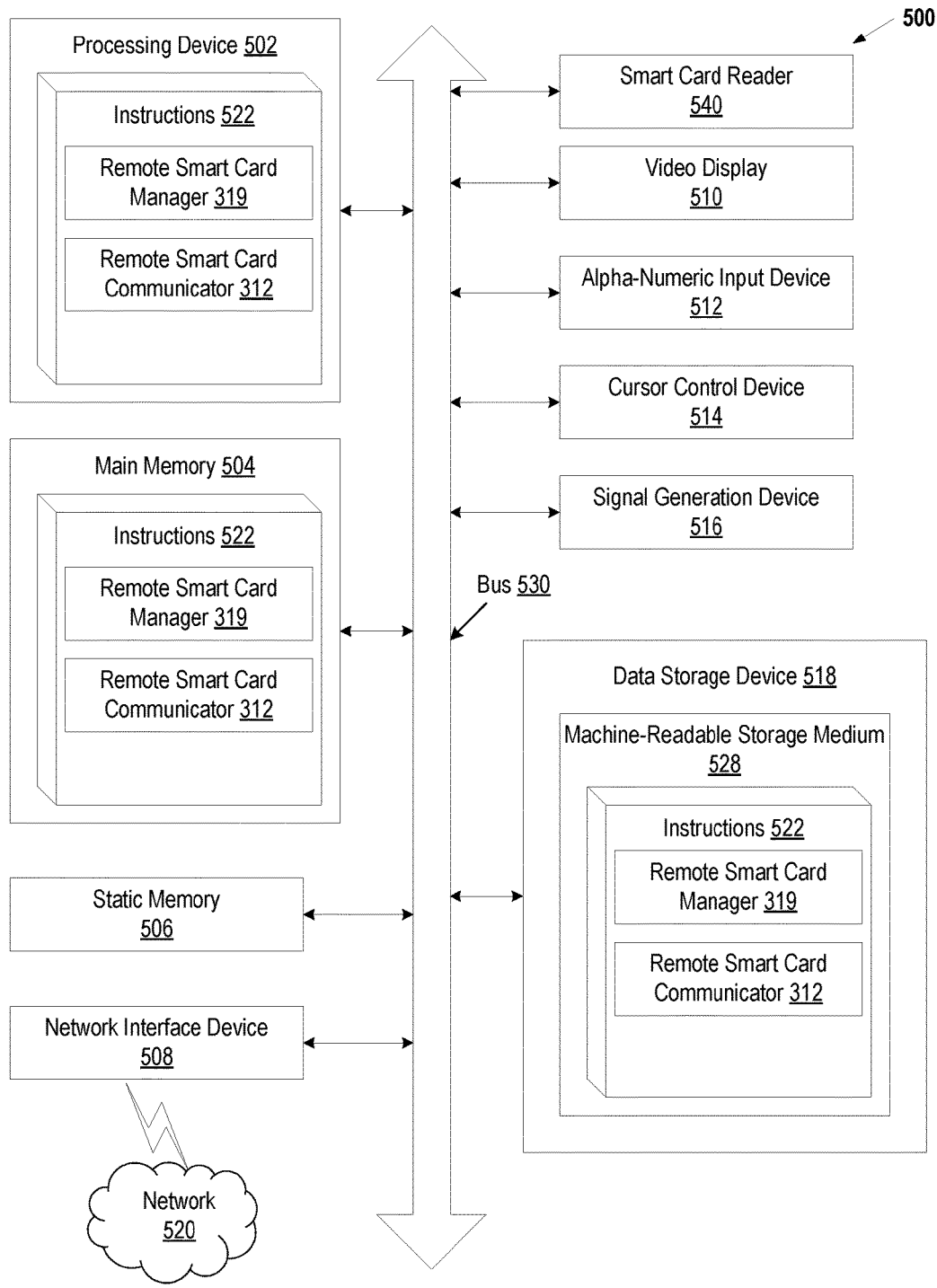
FIG. 5 depicts a block diagram of an example computing device operating in accordance with one or more aspects of the present disclosure.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data store device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a smart card reader 540 and a network interface device 508. The computer system 500 also may include a video display unit 510 (e.g., a liquid crystal display (LCD) or a cathode ray tube (CRT), an alphanumeric input device 512 (e.g., a keyboard), a cursor control device 514 (e.g., a mouse), and a signal generation device 516 (e.g., speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for a remote smart card manager (e.g., remote smart card manager 319 of FIG. 3) and/or a remote smart card communicator (e.g., remote smart card communicator 312 of FIG. 3), and/or a software library containing methods that call the remote smart card manager and/or remote smart card communicator. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "establishing" or "detecting" or "determining" or "redirecting" or "authenticating" or "allowing" or "receiving" or "inserting" or "identifying" or "changing" or "sending" or "modifying" the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    establishing, by a processing device of a server executing an application, a network connection to a client device having a smart card;
    detecting a program call directed to a smart card application programming interface (API) to authenticate a user of the client device for accessing the application;
    determining, based on the program call, whether the smart card is a remote smart card for the server;
    responsive to determining that the smart card is the remote smart card, redirecting the program call to the client device via a separate communication channel of the network connection; and authenticating, by the server using a local security authority system, the user of the client device in view of data returned by the client device in response to the program call, the local security authority system considering the remote smart card to be local to the server.

2. The method of claim 1, further comprising:

responsive to determining that the smart card is a local smart card for the server and not a remote smart card for the server, allowing, by the processing device, the program call to be received by the smart card API.

3. The method of claim 1, further comprising:

prior to detecting the program call, receiving a personal identification number (PIN) of the user from the client device to initiate authentication of the user for accessing the application, the PIN being associated with the smart card; and inserting the PIN as a parameter in the program call.

4. The method of claim 3, wherein the data is at least one of one or more user credentials stored on the smart card or a value confirming that the PIN is valid.

5. The method of claim 1, wherein determining whether the smart card is a remote smart card for the server comprises:

identifying a session parameter in the program call;

determining whether the session parameter is valid; and determining the smart card is a remote smart card for the server in response to determining that the session parameter is not valid.

6. The method of claim 1, wherein detecting the program call comprises:

changing an association of a network socket corresponding to the separate communication channel of the network connection from an authentication server to a local security authority subsystem service (LSASS) of the local security authority system, wherein the program call is issued by the LSASS, and wherein redirecting the program call comprises sending a remote procedure call corresponding to the program call to the client device via the network socket.

7. The method of claim 6, further comprising:

determining that authentication of the user is complete; and modifying the changed association of the network socket from the LSASS to the authentication server to allow the authentication server to communicate with the client device.

8. The method of claim 1, wherein the server is a remote desktop session host (RDSH) server and the application is at least one of an email application, a word processing application, a spreadsheet application, a presentation application.

9. The method of claim 1, wherein the network connection is established prior to initiating a remote desktop protocol (RDP) session with the client device.

10. A system comprising:

a memory; and a processing device of a server executing an application, coupled to the memory, to:

establish a network connection to a client device having a smart card;

detect a program call directed to a smart card application programming interface (API) to authenticate a user of the client device for accessing the application;

determine, based on the program call, whether the smart card is a remote smart card for the server;

responsive to determining that the smart card is the remote smart card, redirect the program call to the client device via a separate communication channel of the network connection; and authenticate, by the server using a local security authority system, the user of the client device in view of data returned by the client device in response to the program call, the local security authority system considering the remote smart card to be local to the server.

11. The system of claim 10, wherein to determine whether the smart card is a remote smart card for the server, the processing device is to:

identify a session parameter in the program call;

determine whether the session parameter is valid; and determine the smart card is a remote smart card for the server in response to determining that the session parameter is not valid.

12. The system of claim 10, wherein to detect the program call, the processing device is to:

change an association of a network socket corresponding to the separate communication channel of the network connection from an authentication server to a local security authority subsystem service (LSASS) of the local security authority system, wherein the program call is issued by the LSASS, and wherein to redirect the program call, the processing device is to send a remote procedure call corresponding to the program call to the client device via the network socket.

13. The system of claim 12, wherein the processing device is further to:

determine that authentication of the user is complete; and modify the changed association of the network socket from the LSASS to the authentication server to allow the authentication server to communicate with the client device.

14. The system of claim 10, wherein the network connection is established prior to initiating a remote desktop protocol (RDP) session with the client device.

15. A non-transitory computer readable medium having instructions stored thereon that, when executed by a processing device, cause the processing device to perform operations comprising:

establishing, by the processing device, a network connection to a client device having a smart card, the processing device being of a server executing an application;

detecting a program call directed to a smart card application programming interface (API) to authenticate a user of the client device for accessing the application;

determining, based on the program call, whether the smart card is a remote smart card for the server;

responsive to determining that the smart card is the remote smart card, redirecting the program call to the client device via a separate communication channel of the network connection; and authenticating, by the server using a local security authority system, the user of the client device in view of data returned by the client device in response to the program call, the local security authority system considering the remote smart card to be local to the server.

16. The non-transitory computer readable medium of claim 15, wherein determining whether the smart card is a remote smart card for the server comprises:

identifying a session parameter in the program call;

determining whether the session parameter is valid; and determining the smart card is a remote smart card for the server in response to determining that the session parameter is not valid.

17. The non-transitory computer readable medium of claim 15, wherein detecting the program call comprises:
changing an association of a network socket corresponding to the separate communication channel of the network connection from an authentication server to a local security authority subsystem service (LSASS) of the local security authority system, wherein the program call is issued by the LSASS, and
wherein redirecting the program call comprises sending a remote procedure call corresponding to the program call to the client device via the network socket.

18. The non-transitory computer readable medium of claim 17, the operations further comprising:
determining that authentication of the user is complete; and
modifying the changed association of the network socket from the LSASS to the authentication server to allow the authentication server to communicate with the client device.

19. The non-transitory computer readable medium of claim 15, wherein the server is a remote desktop session host (RDSH) server and the application is at least one of an email application, a word processing application, a spreadsheet application, a presentation application.

20. The non-transitory computer readable medium of claim 15, wherein the network connection is established prior to initiating a remote desktop protocol (RDP) session with the client device.

* * * * *